G. M. CRAM.
DISH WASHING MACHINE.
APPLICATION FILED JULY 19, 1909.
954,615.
Patented Apr. 12, 1910.
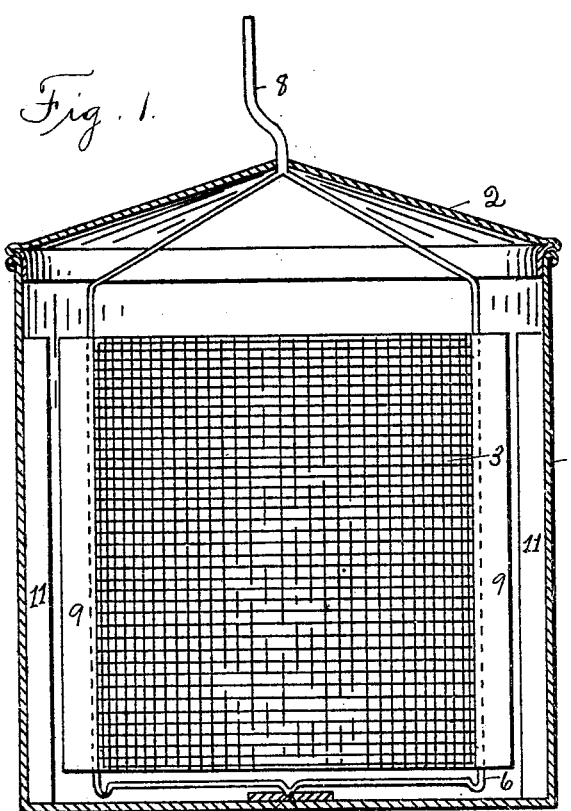
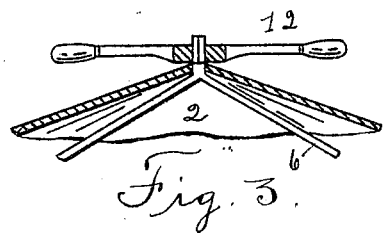
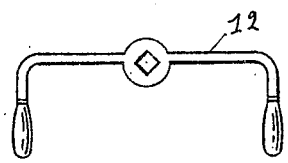
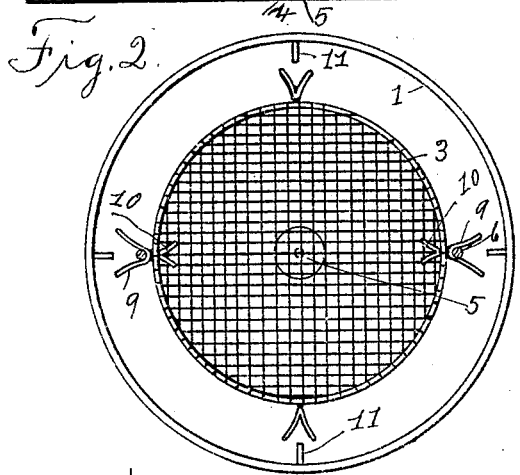
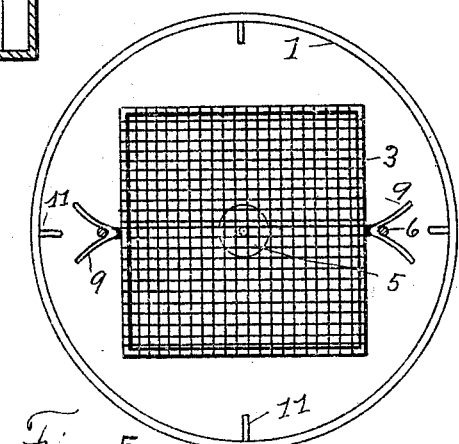
WITNESSES
Marion Richards.
Charles L. Foster.
INVENTOR
George M. Cram
by Clifford & Clifford
Attorneys

UNITED STATES PATENT OFFICE.

GEORGE M. CRAM, OF PORTLAND, MAINE.

DISH-WASHING MACHINE.

954,615.  Specification of Letters Patent.  Patented Apr. 12, 1910.

Application filed July 19, 1909. Serial No. 508,480.

*To all whom it may concern:*

Be it known that I, GEORGE M. CRAM, a citizen of the United States, and residing at Portland, in the county of Cumberland and State of Maine, have invented new and useful Improvements in Dish-Washing Machines, of which the following is a specification.

My invention relates to improvements in dish washing machines. In machines for this purpose as usually constructed where the dishes are placed in a receptacle and rotated the currents of water usually have a continuous direction and therefore oftentimes portions of the dishes are untouched by the moving water and are imperfectly cleansed.

The present invention is designed to obviate these difficulties and to provide a machine which will thoroughly and quickly cleanse the dishes.

In the drawings herewith accompanying and making part of this application, Figure 1 is a vertical sectional view of my improved machine partly in elevation; Fig. 2 is a top plan view of the same with cover removed showing the current producing devices on the inside as well as on the outside of the dish container; Fig. 3 is a fragmental view partly in section showing means of oscillating the dish container; Fig. 4 is a plan view of a different form of handle and Fig. 5 is a plan view of my invention with cover removed showing a square dish container.

Same reference characters indicate like parts.

In said drawings 1 is a tank of any suitable construction and 2 a cover therefor. The dish container 3 is made of wire cloth or other finely perforated material. It is adapted to be rotatably mounted in the tank 1 in any convenient manner as by a pivot 4 stepped in a recessed plate 5 secured to the bottom of the tank. For convenience I secure to the dish container a wire 6 passing horizontally across the bottom of the container with an offset 4 at the center for a pivot, thence vertically along the sides thereof, and brought together at a common point at the top terminating in a crank 8.

Secured to the outside of the dish container are V-shaped projections 9 flaring outwardly spaced apart at suitable distances around the container. I may also provide similar V-shaped projections 10 secured to the inside of the container and flaring inwardly. The tank may also be provided with inwardly extending projections 11 which still further tend to break up the currents of water. In Fig. 1, I have shown the container with a crank 8 whereby the container may be rotated in the tank. An oscillating motion can be imparted to the dish container by means of the handle bars 12 shown in Figs. 3 and 5, the oscillating movement having a tendency still further to diversify the currents in the container.

In Fig. 5, I have shown my invention as applied to a square container. It will be apparent that the shape of the tank and container and the means of imparting motion to the container may be varied at will and still be within the spirit and scope of my invention.

The advantages of my improved dish washing machine are that the V-shaped projections in connection with the open mesh dish container when the container is rotated set the water in violent agitation creating a great number of currents moving in different directions thus thoroughly cleansing the dishes whatever their shape or position. The dish container can be readily removed from the tank and the tank and container can themselves be thoroughly cleansed when not in use. The device is very durable, simple in construction, easy in operation and will not get out of order.

Having thus described my invention and its use I claim :—

1. In a dish washing machine, a tank, a perforated dish container pivotally mounted therein and provided with V-shaped projections secured to the walls thereof.

2. A dish washing machine comprising a suitable tank, a perforated dish container having V-shaped projections secured to the outside thereof and flaring outwardly.

3. In a dish washing machine, a tank provided with vertical inwardly extending projections, in combination with a dish container pivotally mounted therein and provided with V-shaped vertically extending projections secured to said container and means for imparting a circular movement to said container.

In testimony whereof I have signed my name to this specification in presence of two subscribing witnesses this 17th day of July, 1909.

GEORGE M. CRAM.

In presence of—
ELGIN C. VERRILL,
MARION RICHARDS.